United States Patent
Taboso Ballesteros et al.

(10) Patent No.: US 10,154,050 B2
(45) Date of Patent: Dec. 11, 2018

(54) DEVICE AND A METHOD FOR DETECTING AND ANALYZING SIGNALS IN THE ULTRASOUNDS FREQUENCY SPECTRUM FOR ELECTRONIC COMMUNICATIONS DEVICES

(71) Applicant: The Boeing Company, Chicago, IL (US)

(72) Inventors: Pedro Taboso Ballesteros, Madrid (ES); Rosa Maria Rodriguez Montejano, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 304 days.

(21) Appl. No.: 15/169,221

(22) Filed: May 31, 2016

(65) Prior Publication Data
US 2016/0381053 A1    Dec. 29, 2016

(30) Foreign Application Priority Data

Jun. 23, 2015    (EP) .................................... 15382333

(51) Int. Cl.
*H04L 29/06* (2006.01)
*H04B 11/00* (2006.01)

(52) U.S. Cl.
CPC .......... *H04L 63/1416* (2013.01); *H04B 11/00* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 6,850,173 B1 | 2/2005 | Steinbrecher | |
| 8,670,721 B2* | 3/2014 | Mody | H04L 63/1458 370/252 |
| 8,818,273 B2 | 8/2014 | Jung et al. | |
| 9,301,141 B1* | 3/2016 | Mincher | H04W 4/70 |
| 2008/0151762 A1* | 6/2008 | Armstrong | H04W 24/08 370/241 |
| 2010/0254432 A1* | 10/2010 | Frebel | H04B 1/7143 375/136 |
| 2013/0094330 A1 | 4/2013 | Holyoak et al. | |
| 2014/0050321 A1 | 2/2014 | Albert et al. | |
| 2015/0188932 A1* | 7/2015 | King | H04L 63/1408 726/22 |

(Continued)

OTHER PUBLICATIONS

European Patent Office; European Search Report for Application No. EP 15 38 2333 dated Dec. 16, 2015.

*Primary Examiner* — Michael R Vaughan
(74) *Attorney, Agent, or Firm* — Parsons Behle & Latimer

(57) ABSTRACT

A device and a method for monitoring continuously the activity of a microphone and a speaker of an electronic communications device, filtering any emitted or received signal in the ultrasound frequency spectrum (signals ≥17 kHz) and assessing whether the emitted or received signal is malicious or benign, in order to detect and avoid malicious transmissions established on the ultrasounds frequency spectrum. If a malicious transmission is detected, the user is alerted and can allow or deny said transmission. The device and method are a new concept of Information Technology defense systems that complements traditional antivirus.

14 Claims, 2 Drawing Sheets

(56) References Cited

U.S. PATENT DOCUMENTS

| | | | |
|---|---|---|---|
| 2016/0253907 A1* | 9/2016 | Taveira | G08G 5/006 |
| | | | 701/3 |
| 2016/0277925 A1* | 9/2016 | Bengtsson | H04B 11/00 |
| 2017/0310801 A1* | 10/2017 | Shen | H04W 88/02 |

* cited by examiner

DEVICE AND A METHOD FOR DETECTING AND ANALYZING SIGNALS IN THE ULTRASOUNDS FREQUENCY SPECTRUM FOR ELECTRONIC COMMUNICATIONS DEVICES

CROSS-REFERENCE TO RELATED APPLICATIONS

This application, under 35 U.S.C. § 119, claims the benefit of E.P. Application No. 15382333.1, filed on Jun. 23, 2015 and entitled "A Device and a Method for Detecting and Analyzing Signals in the Ultrasounds Frequency Spectrum for Electronic Communications Devices," the contents of which are hereby incorporated by reference in their entirety.

FIELD OF THE DISCLOSURE

The present disclosure relates to a device and a method for monitoring the activity of a microphone and a speaker of an electronic communications device in order to detect and avoid malicious transmissions established on the ultrasounds frequency spectrum. If a malicious transmission is detected, the device alerts the user, who may allow or deny said transmission.

BACKGROUND OF THE DISCLOSURE

As it is known, covert channels are communication channels using means of communication that have not been designed with that purpose. It is a type of cyber attack. Covert channels manipulate a communication medium in order to transmit information in an almost undetectable fashion.

Transmissions over the ultrasound spectrum typically have a short distance range due to attenuation. Thus covert channels over ultrasound frequency can have special relevance in scenarios where there is a great concentration of personal devices (laptops, mobile phones, tablets, etc.) in a reduced surface, like airports or aircrafts. Nowadays, the use of tablets is becoming more and more common in the daily aircraft maintenance and operation.

These kind of channels are established by malware to communicate with the command and control server in order to avoid detection by traditional security tools such as antivirus and Intrusion Detection Systems (IDSs). Due to sensitive information that is stored in the cockpit in devices such as Electronic Flight Bags (EFBs) or maintenance devices, these devices are considered as attractive targets for potential cyber attacks.

New malware families are able to establish covert channels in the ultrasound frequency range between different computing systems using audio modulation/demodulation to exchange data between different electronic devices over the air medium.

Microphones and speakers are not currently considered common channels for malicious datalinks, so existing tools do not monitor their activities searching for anomalous behaviors.

Current cyber security is based both in host and network solutions monitoring and in checking the traffic transmitted and received from traditional interfaces (such as Wi-Fi or Ethernet). Firewalls, antivirus, and Intrusion Detection Systems are available from multiple developers and for different platforms and operating systems. However none of them are designed to monitor possible ultrasound transmission through the speaker and the microphone of an electronic device to protect.

As electronic devices such as mobile phones have become very secure, attackers are using unconventional methods for exfiltrating data. IT systems and networks are becoming a critical element of the aircraft generation paradigm. Thus, aeronautical manufacturers and airlines are interested in cyber security solutions to protect their sensitive information and assets.

Speakers on mobile devices can produce ultrasonic sounds, which are frequencies too high for humans to hear, and these inaudible frequencies can be received/detected by a microphone on the same device or on another device.

Ultrasonic sounds do not require permission and can emit sounds to anything that can hear them. Sound can be defined as vibrations in matter, and for example if the user is not holding the electronic device, the vibrations are not noticed.

There are currently no cyber security products to monitor these kinds of transmissions and react when they are detected.

The device and/or method of the present disclosure alerts the user when a malicious transmission is detected, and provides the opportunity of blocking the transmission and uninstalling the application causing the problem.

SUMMARY

Next, a description of several examples of embodiment of the present disclosure is carried out, with illustrative character and without limitation.

A first embodiment of the present disclosure is to provide a device for detecting and analyzing signals in the ultrasounds frequency spectrum for electronic communications devices, the device is configured to receive as inputs signals emitted by a speaker of the electronic communications device and signals received by a microphone of the electronic communications device. The device comprises a processor for detecting malicious emitted or received ultrasound signals, emitted by the speaker and/or received by the microphone, wherein the processor comprises: a filter module comprising at least one filter for filtering the emitted and/or received signals in the ultrasound frequency bandwidth (high pass band filter with a cutoff frequency of 17 kHz); an analyzer module configured to analyze the emitted and/or received ultrasound signals, identify an application source/destination of the emitted and/or received ultrasound signals, compare the application source/destination with a black list of known malicious applications (the analyzer module comprises means for updating and a memory for storing the black list of malicious applications), detect repeated emitted and/or received ultrasound signals indicating an existing conversation with another device, record a sound level of the emitted and/or received ultrasound signals; and a decision module configured to classify the emitted and/or received ultrasound signals as benign or malicious, depending on the results returned by the analyzer module.

In a second embodiment, the present disclosure comprises an electronic communications device comprising the processor, a microphone and a speaker.

In a third embodiment of the present disclosure, a method is provided for detecting and analyzing signals in the ultrasounds frequency spectrum for electronic communications devices. The method monitors continuously the activity of the speaker and the microphone, where if an emitted or received signal is not detected, then the method keeps on monitoring both the speaker and the microphone, and if an emitted or received signal is detected, then the method filters the emitted or received signal in the ultrasound frequency spectrum and assesses whether the emitted or received ultrasound signal is malicious or benign. If the emitted or received ultrasound signal is considered malicious, the transmission of the signal is blocked, and an alert notification is sent to the user of the electronic device warning about the transmission of a malicious emitted or received ultrasound signal. On the contrary, if the emitted or received ultrasound signal is considered benign, the transmission of the signal is allowed and the method keeps on monitoring the speaker and the microphone. Once the user has received the alert notification, said user can decide to accept the transmission of the malicious emitted or received ultrasound signal or deny it, if the user accepts the transmission, the transmission is allowed and the method keeps on monitoring the speaker and the microphone. However, if the user denies the transmission, the transmission is not allowed and said user has the possibility then to uninstall or not uninstall the application source/destination of the electronic communications device. If the user decides to not uninstall the application source/destination, then the method keeps on monitoring the speaker and the microphone, but if the user decides to uninstall the application source/destination, said application source/destination is uninstalled and the method keeps on monitoring the speaker and the microphone.

In order to identify the application source/destination trying to send/receive an ultrasound signal, the device and/or method of the present disclosure is continuously monitoring the list of active processes and detects if any of them request access to the speaker or the microphone. The name of the process unambiguously identifies the application source/destination.

In one embodiment, once an emitted or a received ultrasound signal is detected, the processor assesses whether the emitted or received ultrasound signal is malicious or benign by analyzing parameters P1, P2, P3 and P4 simultaneously, following these sub-steps: checking if the application source/destination that originates the emission/reception of the ultrasound signals is in a black list, if the application source/destination is in the black list, then P1=1, if not P1=0; checking if the emitted or received ultrasound signals are related to open/active applications, operating system alerts or normal vibration alerts, if the emitted or received ultrasound signals are related to open/active applications, operating system alerts or normal vibration alerts, then P2=0, if not P2=1; checking if there are back and forth emitted or received ultrasound signals indicating an ultrasound conversation with other device, if there is an ultrasound conversation, then P3=1, if not P3=0; measuring the sound level L of the emitted or received ultrasound signals and comparing L with an established threshold $L_{th}$, if $L>L_{th}$, then P4=1, if not P4=0.

Advantageously, the threshold $L_{th}$ is established as the average peak value of the emitted or received ultrasound signal during a determined time period with a sample rate of one per second.

In another embodiment, the alert notification sent to the user depends on the parameters evaluated. The alert level is classified on this way: the alert is "red" if P1=1 or P1=0, P2=1, P3=1 and P4=0 or P1=0, P2=0, P3=1 and P4=0; the alert is "orange" if P1=0, P2=1, P3=0 and P4=0/1; and the alert is "yellow" if P1=0, P2=0, P3=0 and P4=1.

DETAILED DESCRIPTION

The present disclosure relates to a device and a method for monitoring the activity of a microphone and a speaker of electronic communications devices in order to detect and avoid malicious transmissions established on the ultrasounds frequency spectrum. If a malicious transmission is detected, the user is alerted and can allow or deny said transmission.

The present disclosure allows the user of an electronic device to know if its electronic device is emitting or receiving signals established on the ultrasounds frequency spectrum in real time, thus detecting covert channels established among electronic communications devices (smartphones, tablets, etc.) not physically interconnected, using the speaker of the electronic device to transmit data within the ultrasound frequency range to another electronic device and using the microphone to receive also data within the ultrasound frequency range from another electronic device.

For establishing these covert channels a malicious application has had to be installed previously in the electronic device, either on purpose or accidentally. Until the method or device of the present disclosure determines that the installed application is not really a malicious application, it will be considered a suspicious application. It may be possible that this suspicious application is one of the malicious applications that can establish covert channels when a signal is emitted or received or the suspicious application may not be such a malicious application. These covert channels are not noticed by the user, since they are transmitted out of the range of human audible frequencies. However, the device and method of the present disclosure makes it possible to detect these covert channels, alert the user of the existence of transmission on the covert channels, and then, the user may allow or deny the transmission of the signal.

This suspicious application is the application source/destination, source when it is emitting a signal and destination when it is receiving a signal. So, if the electronic device is infected, the speaker can emit signals sending sensitive information stored in the device. In an aircraft, these types of devices can be Electronic Flight Bags (EFBs) or maintenance devices. For example, the microphone of an Electronic Flight Bags (EFBs) or of a maintenance device can receive instructions by remote access to be executed in the electronic device, managing said electronic device. Outside the aeronautical domain, any device provided with a loudspeaker and a microphone (e.g., laptops, smartphones, tablets, etc.) can be subjected to the type of attack described in this disclosure.

Figure 2:
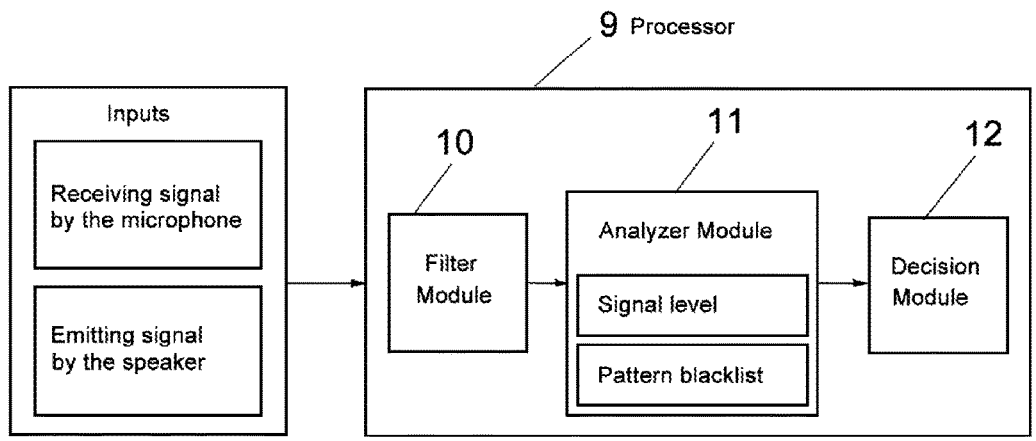
FIG. 2 illustrates a particular embodiment of a block diagram representing the device for detecting and analyzing signals in the ultrasound frequency spectrum for electronic communications devices.

One embodiment of the present disclosure as shown in FIG. 2 includes a processor (9) that, in turn, comprises:
- a filter module (10) comprising at least one filter with a cutoff frequency of 17 kHz for filtering the emitted or received signals in that predetermined frequency bandwidth. The cutoff frequency may vary depending of an specific application;
- an analyzer module (11) configured to analyze the emitted or received ultrasound signals (previously filtered), identify an application source/destination of the emitted or received ultrasound signals, compare the application source/destination with a black list of known malicious applications, detect if there is repeated emission/reception of ultrasound signals indicating an existing conversation with another device, record the sound level of the emitted or received ultrasound signals; and
- a decision module (12) configured to classify the emitted or received signals as benign or malicious, depending on the results returned by the analyzer module (11).

The processor (9) detects emitted or received ultrasound signals in the non-audible frequency range and assesses whether these emitted or received ultrasound signals are malicious or benign. The simple emission/reception in these frequencies can be the first alert to analyze these emitted or received signals.

Another embodiment of the present disclosure is an electronic communications device that comprises: a storage device for storing at least one software application (the method described herein); a microphone and a speaker; it further comprises the at least processor (9) for detecting abnormal behaviors in the activity (communications) performed by the speaker and the microphone of the electronic communications device to protect.

Another embodiment of the present disclosure is a method (software application) that is carried out by the electronic communications device described in the preceding paragraphs. Said method comprises the following steps:
a) Monitoring continuously the activity of the speaker and the microphone
   if an emitted or received signal is not detected then step a);
   if an emitted or received signal is detected then step b);
b) filtering any emitted or received signal in the ultrasound frequency spectrum (signals ≥17 kHz) and assessing whether the emitted or received ultrasound signal is malicious or benign. At the same time, in order to identify the application trying to send/receive an ultrasound signal, the method continuously monitors the list of active processes and detects if any of them request access to the speaker or the microphone. The name of the process unambiguously identifies the application source/destination (suspicious application);
   if the emitted or received ultrasound signal is considered benign, the transmission of the signal is allowed and then step a);
   if the emitted or received ultrasound signal is considered malicious, the transmission of the signal is blocked, then step c);
c) sending an alert notification to the user of the electronic communications device warning about the transmission of a malicious emitted or received ultrasound signal;
d) instructing the user to accept the transmission of the malicious emitted or received ultrasound signal or deny it;
   if the user accepts the transmission, the transmission is allowed, then step a);
   if the user denies the transmission, the transmission is not allowed, then step e);
e) instructing the user to decide whether or not to uninstall the application source or destination (suspicious application) causative of the malicious emitted or received ultrasound signal;
   if the user accepts uninstalling the application source/destination from the user's electronic device, the application source/destination is uninstalled, then step a);
   if the user denies uninstalling the application source/destination, the application source/destination will remain in the electronic device, then step a).

In a first embodiment, once emitted or received signals ≥17 kHz are detected, the processor (9) assesses whether the emitted or received ultrasound signal is malicious or benign by analyzing the following parameters (P1, P2, P3 and P4) simultaneously:
checking if the application source/destination that originates the emission/reception is in a black list (the list is frequently updated via internet by the developer/owner of the method of this disclosure and stored in a memory of the electronic communications device):
   if the application source/destination is in the black list, then P1=1
   if the application source/destination is not in the black list, then P1=0;
checking if the emitted or received ultrasound signals are related to open/active applications: video, music, telephone calls, clock alarm, calendar notice, whatsapp, etc; to operating system alerts: low battery alert, etc, or to normal vibration alerts (arriving emails, SMS, telephone calls, charging mode, etc):
   if the emitted or received ultrasound signals are related to open/active applications, operating system alerts or normal vibration alerts, then P2=0;
   if the emitted or received ultrasound signals are not related to open/active applications, operating system alerts or normal vibration alerts, then P2=1;
checking if there is an ultrasound conversation with other device (detection of back and forth emitted or received ultrasound signals)
   if there is an ultrasound conversation, then P3=1;
   if there is not an ultrasound conversation, then P3=0;
measuring the sound level L of the emitted or received ultrasound signals and comparing it with an established threshold $L_{th}$
   if $L > L_{th}$, then P4=1;
   if $L < L_{th}$, then P4=0.

Advantageously, the threshold $L_{th}$ established for the parameter P4 is set by historic average spectrum sound levels emitted and received. The threshold is measured and stored (in the RAM assigned to the application) by the processor (9) during the normal working hours of the device.

In another embodiment, the alert notification sent to the user depends on the parameters evaluated. The alert level is classified on this way:
the alert is red if
   A→P1=1; or,
   C→P1=0, P2=1, P3=1 and P4=0; or,
   D→P1=0, P2=0, P3=1 and P4=0;
the alert is orange if
   B→P1=0, P2=1, P3=0 and P4=0 or 1;
the alert is yellow if
   E→P1=0, P2=0, P3=0 and P4=1.

The chart below summarizes the above different cases:

|  | A | B | C | D | E |
|---|---|---|---|---|---|
| P1 (blacklist app) | 1 | 0 | 0 | 0 | 0 |
| P2 (not expected) |  | 1 | 1 | 0 | 0 |
| P3 (conversation) |  | 0 | 1 | 1 | 0 |
| P4 (L > $L_{th}$) |  | 0/1 | 0 | 0 | 1 |
| ALERT LEVEL | RED | ORANGE | RED | RED | YELLOW |

A) If P1 is 1, it means that the system has detected that the application receiving/sending the transmission is in the black list stored by the system, then there is no need to continue, the rest of the parameters don't need to be checked. The alert triggered is considered 'red'.

B) If P1 is 0 and P2 is 1, it means that the application receiving/sending the transmission is not in the black list (P1=0), and in addition the transmission does not correspond to any of the open/active applications, operating system alerts or normal vibration alerts in the device capable of emitting sound (P2=1) and the system has not detected any back and forth transmission, there is no indication of conversation with another device (P3=0). The fact of detecting unexpected sound emission/reception independently of the sound level registered (P4 can be either 0 or 1), triggers an alert 'orange'.

C) If P1 is 0 and P2 is 1, and P3 is 1 means that the application receiving/sending the transmission is not in the black list (P1=0), and the transmission does not correspond to any of the open/active applications, operating system alerts or normal vibration alerts in the device capable of emitting sound (P2=1). In addition the system has detected back and forth transmission, so there is conversation between microphone and speaker (P3=1). The alert triggered is 'red'.

D) If P1 is 0 and P2 is 0, and P3 is 1 means that the application receiving/sending the transmission is not in the black list (P1=0), and the transmission corresponds to any of the open/active applications, operating system alerts or normal vibration alerts in the device capable of emitting sound (P2=0). In addition the system has detected back and forth transmission, so there is conversation between microphone and speaker (P3=1). The alert triggered is 'red'.

E) If P1 is 0, P2 is 0, P3 is 0 means that suspiciously high sound levels have been found in the frequency band of interest (P4=1). When the previous parameters are negative (the application receiving/sending the transmission is not in the black list (P1=0), the transmission corresponds to any of the open/active applications, operating system alerts or normal vibration alerts in the device capable of emitting sound (P2=0), no conversation is detected (P3=0)). The alert triggered is 'yellow'.

For checking if the emitted or received ultrasound signals are related to open/active applications, operating system alerts or normal vibration alerts, the processor (9) needs to have the sound emission/reception requirements of the open/active applications operating system alerts or normal vibration alerts.

The method can be implemented in different electronic devices platforms (Android, iOS, Windows Mobile . . . ) as would be appreciated by one of ordinary skill in the art having the benefit of this disclosure.

Additionally, in order to detect if the device and/or method of the present disclosure is used by others without license, it would be possible to implement means of detection like, for example, an automated reporting system that will periodically report to the owner's server.

Figure 1:
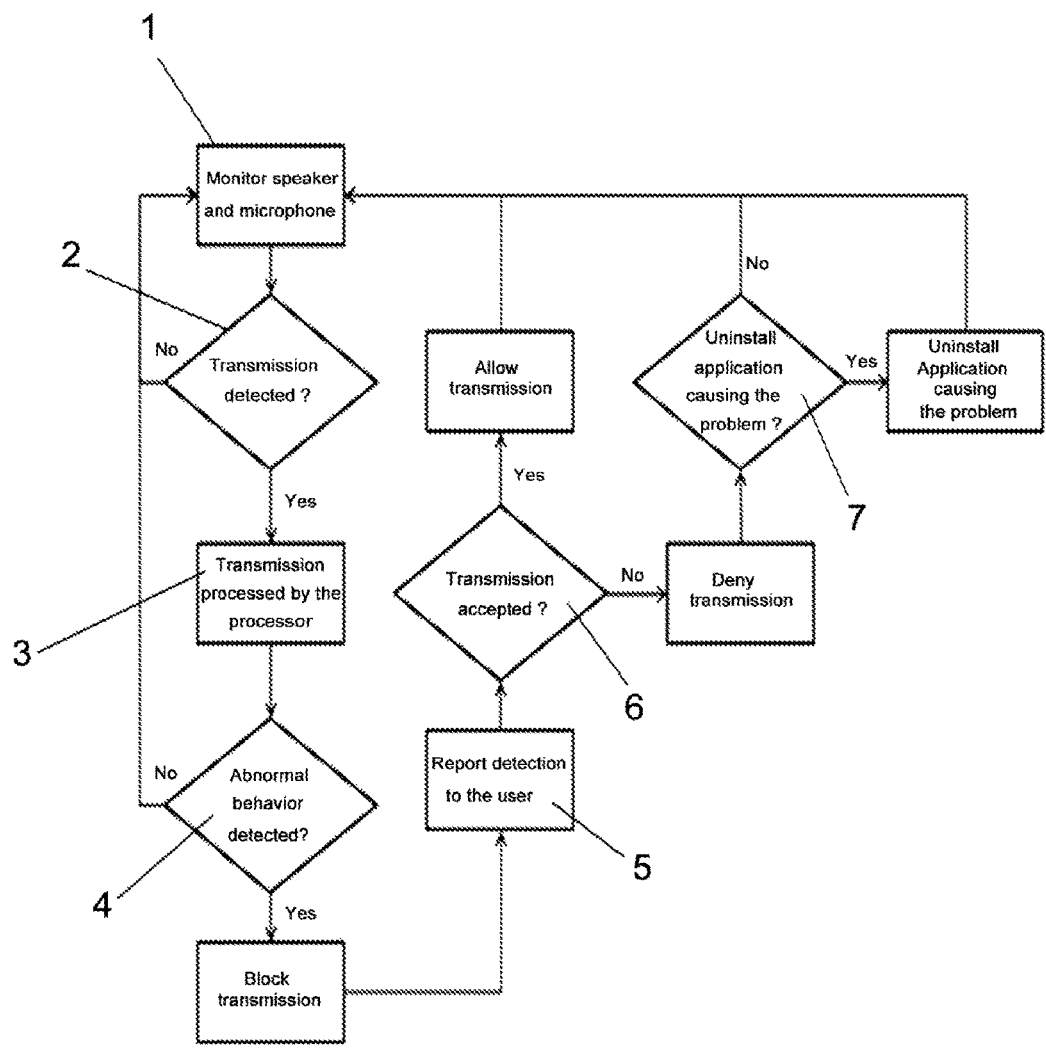
FIG. 1 illustrates a flow chart of a particular embodiment of the method for detecting and analyzing signals in the ultrasounds frequency spectrum for electronic communications devices.

FIG. 1 shows a particular embodiment of a flow chart of the method for detecting and analyzing signals in the ultrasounds frequency spectrum. Said method comprises the following steps:

As shown in step 1, the method monitors continuously the activity of the speaker and the microphone. At step 2, the method detects whether there is an emitted or received signal. If there is an emitted or received signal detected, the method proceeds to step 3. If there is not an emitted or received signal detected, the method proceeds back to step 1. At step 3, the method filters any emitted or received signal in the ultrasound frequency spectrum (signals ≥17 kHz) and assesses whether the emitted or received ultrasound signal is malicious or benign. At the same time, in order to identify the application trying to send/receive an ultrasound signal, the method is continuously monitoring the list of active processes and detects if any of them request access to the speaker or the microphone. The name of the process unambiguously identifies the application source/destination (suspicious application). At step 4, the method determines whether the emitted or received ultrasound signal is considered benign (no abnormal behavior), if so the transmission of the signal is allowed and then method returns to step 1. If the emitted or received ultrasound signal is considered malicious (abnormal behavior), the transmission of the signal is blocked, and then the method proceeds to step 5. Next, at step 5, the method sends an alert notification to the user of the electronic device warning about the transmission of a malicious emitted or received ultrasound signal. In step 6, the user decides whether to accept the transmission of the malicious emitted or received ultrasound signal or deny it. If the user accepts the transmission, the transmission is allowed, then the method returns to step 1. If the user denies the transmission, the transmission is not allowed, then the method proceeds to step 7. At step 7, the user decides whether to uninstall the application source/destination. If the user accepts uninstalling the application source/destination from the user's electronic device, the application source/destination is uninstalled, then the method returns to step 1. If the user denies uninstalling the application source/destination, the application source/destination will remain in the electronic device, then the method returns to step 1.

FIG. 2 illustrates a particular embodiment of a block diagram representing the device (processor (9)) for detecting and analyzing signals in the ultrasound frequency spectrum for electronic communications devices. Said processor (9) comprises: a filter module (10) comprising at least one filter with a cutoff frequency of 17 kHz for filtering the emitted or received signals in that predetermined frequency bandwidth; an analyzer module (11) configured to analyze the emitted or received ultrasound signals, identify an application source/destination of the emitted or received ultrasound signals, compare the application source/destination with a black list of known malicious applications, detect if there is repeated emission/reception of ultrasound signals indicating an existing conversation with another device, record the sound level of the emitted or received ultrasound signals; and a decision module (12) configured to classify the emitted or received signals as benign or malicious, depending on the results returned by the analyzer module (11). The inputs to the processor (9) are the receiving signal by the microphone and the emitting signal by the speaker.

Figure 3:
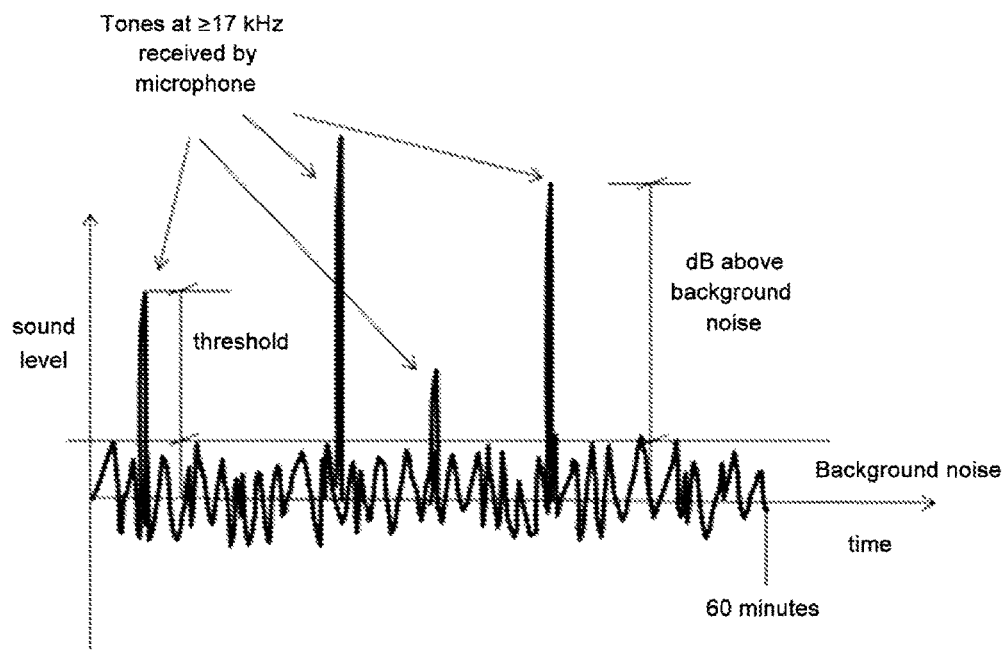
FIG. 3 illustrates an example of an emitted or received signal in the ultrasounds frequency spectrum (≥17 kHz) detected by the processor. The threshold is established as the average peak value of the ultrasound signal during the last sixty minutes with a sample rate of one per second.

Referring to FIG. 3, there is illustrated an embodiment of how to establish a threshold for parameter P4. All smartphones (laptops, tablets) emit with a signal to noise ratio. When an ultrasound signal (≥17 kHz) is emitted and detected by the processor (9), it has to be compared with the level of background noise. It is assumed that the malicious emitted or received ultrasound signal needs a high level of emission to be able to reach the microphone of the smartphone (laptops, tablets) it tries to communicate with. In reception, after filtering the frequencies of interest (≥17 kHz), the processor (9) compares the noise level in this frequency band with the background noise. The threshold will be established as the average peak value of the ultrasound signal during the last sixty minutes with a sample rate of one per second. A signal is considered suspicious if the peak level is at least 3 dB above the established threshold. Other strategies for establishing the threshold may be implemented by the method of the present disclosure.

The description of the different advantageous implementations has been presented for purposes of illustration and description, and is not intended to be exhaustive or limited to the implementations in the form disclosed. Many modifications and variations will be apparent to those of ordinary skill in the art. Furthermore, different advantageous implementations may provide different advantages as compared to other advantageous implementations. Other examples are intended to be within the scope of the claims if they have structural elements that do not differ from the literal language of the claims, or if they include equivalent structural elements with unsubstantial differences from the literal language of the claims.

The invention claimed is:

1. A device for detecting and analyzing signals in an ultrasound frequency spectrum comprising:
   a speaker; and
   a processor for detecting malicious signals in ultrasound signals to be transmitted by the speaker, the processor configured to:
   filter the ultrasound signals in the ultrasound frequency spectrum;
   identify an application source of the ultrasound signals;
   compare the application source with a black list of known malicious applications;
   detect repeated ultrasound signals to be transmitted by the speaker indicating an existing conversation with another device;
   record a sound level of the ultrasound signals; and
   classify the ultrasound signals as benign or malicious based at least on the application source, on the repeated ultrasound signals, and on the sound level.

2. The device of claim 1, further comprising:
   a memory storing the black list of known malicious applications, the processor configured to update the black list when the ultrasound signals are classified as malicious.

3. The device of claim 1, wherein the processor includes a high pass band filter.

4. The device of claim 3, wherein the high pass band filter has a cutoff frequency of 17 kHz.

5. A method for detecting and analyzing signals in an ultrasounds frequency spectrum for an electronic communications device, the method comprising:
   monitoring activity of a speaker and a microphone;
   in response to detecting an ultrasound signal, filtering the ultrasound signal in the ultrasound frequency spectrum;
   assessing whether the ultrasound signal is malicious or benign by comparing an application source with a black list of known malicious applications;
   in response to assessing that the ultrasound signal is benign, permitting transmission of the ultrasound signal and repeating the monitoring of the activity of the speaker and the microphone; and
   in response to assessing that the ultrasound signal is malicious, blocking the ultrasound signal and sending an alert notification to a user of the electronic communications device.

6. The method of claim 5, wherein assessing whether the ultrasound signal is malicious or benign comprises:
   in response to determining that an application is in the black list, setting a first parameter;
   determining whether the ultrasound signal is related to an open or active application, operating system alert, or a vibration alert;
   in response to determining that the ultrasound signal is not related to any open or active application, any operating system alert, or any vibration alert, setting a second parameter;
   determining whether back and forth ultrasound signals exist, indicating an ultrasound conversation with another device;
   in response to determining that back and forth ultrasound signals exist, setting a third parameter;
   measuring a sound level of the ultrasound signal and comparing the sound level with an established threshold; and
   in response to the sound level exceeding the established threshold, setting a fourth parameter.

7. The method of claim 6, wherein the alert notification is classified as red in response to:
   the first parameter being set;
   the first parameter being unset, the second parameter being set, the third parameter being set, and the fourth parameter being unset; or
   the first parameter being unset, the second parameter being unset, the third parameter being set, and the fourth parameter being unset;
   wherein the alert notification is classified as orange in response to:
   the first parameter being unset, the second parameter being set, the third parameter being unset, and the fourth parameter being unset; and
   wherein the alert notification is classified as yellow in response to:
   the first parameter being unset, the second parameter being unset, the third parameter being unset, and the fourth parameter being set.

8. The method of claim 6, wherein the established threshold is an average peak value of the ultrasound signal during a determined time period with a sample rate of one per second.

9. The method of claim 5, further comprising identifying an application associated with of the ultrasound signal.

10. The method of claim 5, further comprising:
    in further response to assessing that the ultrasound signal is malicious, instructing the user to accept or deny transmission of the ultrasound signal;
    in response to an indication of acceptance of transmission, permitting transmission of the ultrasound signal;
    in response to an indication of denial of transmission, blocking transmission of the ultrasound signal and instructing the user for input regarding whether to uninstall an application associated with the ultrasound signal; and
    in response to an instruction to uninstall the application, uninstalling the application.

11. A device for detecting and analyzing signals in an ultrasound frequency spectrum comprising:
- a microphone; and
- a processor for detecting malicious signals in ultrasound signals received by the microphone, the processor configured to:
- filter the ultrasound signals in the ultrasound frequency spectrum;
- identify an application destination of the ultrasound signals;
- compare the application destination with a black list of known malicious applications;
- detect repeated ultrasound signals received by the microphone indicating an existing conversation with another device;
- record a sound level of the ultrasound signals; and
- classify the ultrasound signals as benign or malicious based at least on the application destination, on the repeated ultrasound signals, and on the sound level.

12. The device of claim 11, further comprising:
- a memory storing the black list of known malicious applications, the processor configured to update the black list when the ultrasound signals are classified as malicious.

13. The device of claim 11, wherein the processor includes a high pass band filter.

14. The device of claim 13, wherein the high pass band filter has a cutoff frequency of 17 kHz.

* * * * *